C. P. RALLO.
SHAVING-CASE.
No. 184,904. Patented Nov. 28, 1876.
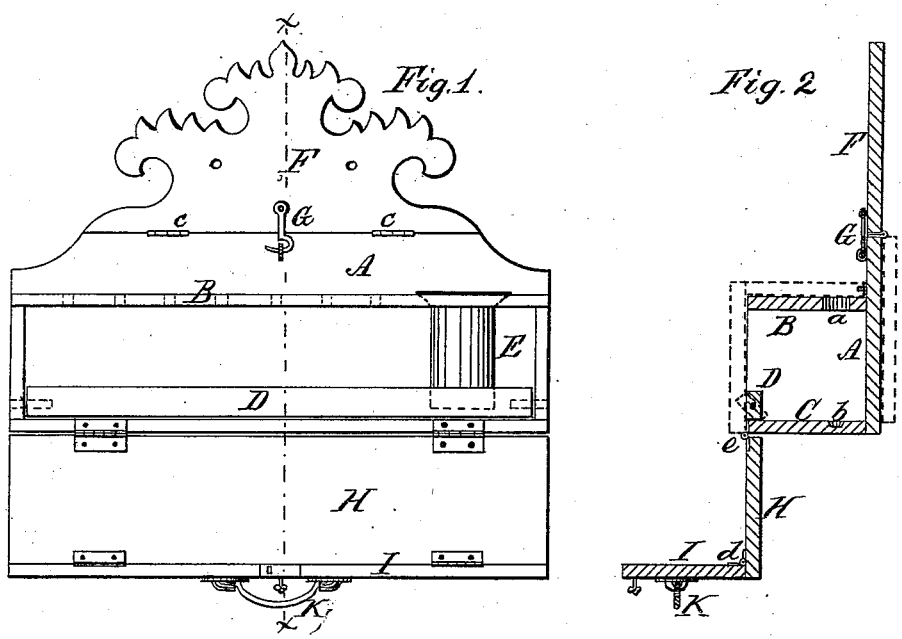
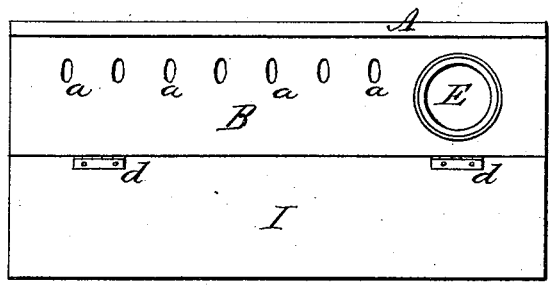
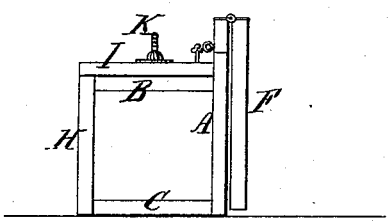
Witnesses:
John Tyler
Jno. J. Bonner
Inventor.
C. P. Rallo
By Attorney

UNITED STATES PATENT OFFICE.

COSTANTINO P. RALLO, OF WASHINGTON, DISTRICT OF COLUMBIA.

IMPROVEMENT IN SHAVING-CASES.

Specification forming part of Letters Patent No. 184,904, dated November 28, 1876; application filed September 23, 1876.

*To all whom it may concern:*

Be it known that I, C. P. RALLO, of Washington, in the District of Columbia, have invented certain new and useful Improvements in Barber's Kit or Shaving-Case; and I do hereby declare that the following is a full and exact description thereof, reference being had to the accompanying drawings, making a part of this specification.

My invention consists of a novel barber's kit or shaving-case, designed to occupy a small space, and opening or unfolding to expose for use the necessary implements for shaving, and forming at the same time two or more shelves for convenience, as will be hereinafter more fully set forth.

To enable others to more fully understand its construction and operation, I will proceed to describe the same, referring by letters to the accompanying drawing, in which—

Figure 1 is a front view of the case opened and exposing the interior thereof. Fig. 2 is a vertical cross-section at the line $x$ $x$ of Fig. 1. Fig. 3 is a top view, open as at Fig. 1; and Fig. 4 is an end view of the case folded and closed for transportation.

Similar letters indicate like parts in the several views.

A is the back of a quadrangular box, the front of which is open, and the top B furnished with a series of holes, $a$, to receive razors when in use, the bottom C being provided with a series of short countersinks, $b$, in line with the holes $a$, to receive the small ends of the razors and sustain them in convenient vertical position.

When not in use, the razors, as well as the brush, strap, &c., are laid in upon the bottom C, and held against falling out by a shallow strip, D, which is swiveled or pivoted at either end to the ends of the box, and which may be turned in the position shown in solid lines at Fig. 2, to retain the implements within the box, or turned down horizontally, to increase the space between it and the top of the box for the introduction of the hand.

The top B is also provided with a suitable hole to receive a soap-cup, E, which is sustained by a flanged top. The back A is provided with an extension, F, of fancy design, secured by hinges $c$, and adapted to fold backward and downward, as seen at Fig. 4, and in dotted lines at Fig. 2, to make the kit more compact, and, when thrown up into the position shown at Figs. 1 and 2, is held in such position by a suitable hook and eye, G.

H is a swinging front, and I a second top, hinged with right-angled hinges to each other, and to the bottom at $d$ and $e$, and, when folded up and over into the position shown in Fig. 4, and in dotted lines, Fig. 2, entirely conceals and protects the interior of the case, and in this position it may be secured by a suitable lock and key, a handle, K, being secured to the second top, and by which the box may be carried.

It will be seen that when the parts H I are thrown down into the position shown most clearly at Fig. 2, the interior is exposed, and the razors, &c., are accessible, and may be placed in position for ready use, the box being hung against the wall, or resting on its bottom C upon a table or bureau, the portion I forming a shelf in addition to the parts B C.

The interior of the front H may be lined with a mirror or not, and many changes may be made in the design and arrangement of the parts without departing from the spirit of my invention.

What I claim as new, and desire to secure by Letters Patent, is—

1. A barber's kit or shaving-box, provided with suitable apartments and shelves for the various tools or implements necessary, and having a front and top connected together by a right-angled hinge, so as to fold into position to conceal and secure the box and its contents, and, when turned down, to expose the same, forming a shelf, substantially as and for the purposes hereinbefore set forth.

2. The back A, provided with an extension, F, hinged at $c$, and adapted to fold down or be secured in an extended position in the same vertical plane with the back A, substantially as and for the purposes set forth.

3. The front strip D, swiveled to the ends of the box to form a guard, and be capable of turning horizontally to increase the space for the introduction of the hand, substantially as hereinbefore set forth.

Witness my hand and seal this 22d day of September, A. D. 1876.

COSTANTINO P. RALLO. [L. S.]

Witnesses:
   JNO. J. BONNER,
   FRANK PHILLIPS.